US 6,568,308 B2

(12) United States Patent
Ricker

(10) Patent No.: US 6,568,308 B2
(45) Date of Patent: May 27, 2003

(54) WORK TABLE WITH A PORTABLE TABLE SAW SUPPORT

(76) Inventor: Wesley Ricker, 6232 Bannock Rd., Westminster, CA (US) 92683

(*) Notice: Subject to any disclaimer, the term of this patent is extended or adjusted under 35 U.S.C. 154(b) by 97 days.

(21) Appl. No.: 09/799,245

(22) Filed: Mar. 5, 2001

(65) Prior Publication Data
US 2002/0124705 A1 Sep. 12, 2002

Related U.S. Application Data
(60) Provisional application No. 60/187,548, filed on Mar. 7, 2000.

(51) Int. Cl.[7] .............................. B27B 5/00; B25H 1/00; B23D 47/02; B27C 9/00
(52) U.S. Cl. .................... 83/477.2; 83/574; 83/701; 83/859; 144/286.5; 108/69; 269/290
(58) Field of Search ........................ 83/477.2, 574, 83/859, 953, 701; 248/670, 676, 637, 671, 672; 269/289 R, 290, 291, 296; 144/286.1, 286.5, 267, 1.1, 287; 108/92, 28, 33, 38, 39, 97, 101, 119, 117, 118, 29, 128, 131, 65

(56) References Cited

U.S. PATENT DOCUMENTS

| | | | | |
|---|---|---|---|---|
| 103,347 A | * | 5/1870 | Lepp | 83/436.3 |
| 2,722,243 A | * | 11/1955 | Nagy | 193/35 TE |
| 2,743,747 A | * | 5/1956 | Franks | 144/286.6 |
| 3,184,190 A | * | 5/1965 | Halfinger | 248/660 |
| 3,931,751 A | * | 1/1976 | Simonson | 83/425 |
| 4,105,055 A | * | 8/1978 | Brenta | 108/13 |
| 4,269,096 A | * | 5/1981 | Boone | 108/18 |
| 4,297,952 A | * | 11/1981 | Zagaroli | 108/83 |
| 4,335,765 A | * | 6/1982 | Murphy | 108/92 |
| 4,406,200 A | * | 9/1983 | Kerr | 83/473 |
| 4,887,653 A | * | 12/1989 | Thomas | 144/286.1 |
| 5,004,029 A | * | 4/1991 | Garner | 108/101 |
| 5,024,257 A | * | 6/1991 | Lloyd | 144/1.1 |
| 5,115,847 A | * | 5/1992 | Taber | 108/69 |
| 5,363,893 A | * | 11/1994 | Grochowicz | 108/69 |
| 5,722,473 A | * | 3/1998 | Tucker | 144/286.1 |
| 5,778,953 A | * | 7/1998 | Braddock | 144/286.1 |
| 5,884,681 A | * | 3/1999 | Nickles | 144/286.1 |
| 6,314,893 B1 | * | 11/2001 | Lee | 108/119 |
| 2001/0047712 A1 | * | 12/2001 | Kahle | 83/859 |

* cited by examiner

Primary Examiner—Boyer D. Ashley
(74) Attorney, Agent, or Firm—Goldstein & Lavas, P.C.

(57) ABSTRACT

A work table with a portable table saw support including a table portion comprised of a pair of elongated horizontal segments positioned in a spaced and parallel orientation. The horizontal segments each include a central section and opposed end sections. The table portion includes a table top secured between the central sections of the horizontal segments whereby empty space exists between corresponding opposed end sections of the horizontal segments. The table portion includes a pair of inverted generally U-shaped legs foldably secured to the table top for elevating the table portion when in an extended orientation. The legs fold against the table top in a closed orientation. The opposed end sections allow a portable table saw to be placed therebetween for elevated use.

1 Claim, 2 Drawing Sheets

WORK TABLE WITH A PORTABLE TABLE SAW SUPPORT

CROSS REFERENCES AND RELATED SUBJECT MATTER

This application relates to subject matter contained in provisional patent application Ser. No. 60/187,548, filed in the United States Patent Office on Mar. 7, 2000.

BACKGROUND OF THE INVENTION

The present invention relates to a work table with a portable table saw support and more particularly pertains to elevating a portable table saw for ease of use while also providing added work space.

The use of table assemblies is known in the prior art. More specifically, table assemblies heretofore devised and utilized for the purpose of supporting work product thereon are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,068,550 to Gray discloses a portable device comprised of four foldable legs for supporting a bench, thereby allowing a portable circular saw to be used as a table saw. U.S. Pat. No. 4,377,099 to Howe discloses a portable table for use with a portable circular saw, comprised of knockdown legs for easy transport and storage. U.S. Pat. No. 5,379,815 to Brazell and U.S. Pat. No. 5,797,307 to Horton each disclose additional foldable tables for use with circular saws.

While these devices fulfill their respective, particular objective and requirements, the aforementioned patents do not describe a work table with a portable table saw support for elevating a portable table saw for ease of use while also providing added work space.

In this respect, the work table with a portable table saw support according to the present invention substantially departs from the conventional concepts and designs of the prior art, and in doing so provides an apparatus primarily developed for the purpose of elevating a portable table saw for ease of use while also providing added work space.

Therefore, it can be appreciated that there exists a continuing need for a new and improved work table with a portable table saw support which can be used for elevating a portable table saw for ease of use while also providing added work space. In this regard, the present invention substantially fulfills this need.

SUMMARY OF THE INVENTION

In the view of the foregoing disadvantages inherent in the known types of table assemblies now present in the prior art, the present invention provides an improved work table with a portable table saw support. As such, the general purpose of the present invention, which will be described subsequently in greater detail, is to provide a new and improved work table with a portable table saw support which has all the advantages of the prior art and none of the disadvantages.

To attain this, the present invention essentially comprises a table portion comprised of a pair of elongated horizontal segments positioned in a spaced and parallel orientation. The horizontal segments each include a central section and opposed end sections. The table portion includes a table top secured between the central sections of the horizontal segments whereby empty space exists between corresponding opposed end sections of the horizontal segments. The table portion includes a pair of inverted generally U-shaped legs foldably secured to the table top for elevating the table portion when in an extended orientation. The legs fold against the table top in a closed orientation. A portable table saw is positionable between either of the opposed end sections of the horizontal segments of the table portion. The portable table saw has a base portion that is positionable within the empty space between the opposed end sections. The portable table saw has a support plate that is extendable over the opposed end sections of the horizontal segments.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved work table with a portable table saw support which has all the advantages of the prior art table assemblies and none of the disadvantages.

It is another object of the present invention to provide a new and improved work table with a portable table saw support which may be easily and efficiently manufactured and marketed.

It is a further object of the present invention to provide a new and improved work table with a portable table saw support which is of durable and reliable construction.

An even further object of the present invention is to provide a new and improved work table with a portable table saw support which is susceptible of a low cost of manufacture with regard to both materials and labor, and which accordingly is then susceptible of low prices of sale to the consuming public, thereby making such a work table with a portable table saw support economically available to the buying public.

Even still another object of the present invention is to provide a new and improved work table with a portable table saw support for elevating a portable table saw for ease of use while also providing added work space.

Lastly, it is an object of the present invention to provide a new and improved work table with a portable table saw support including a table portion comprised of a pair of elongated horizontal segments positioned in a spaced and parallel orientation. The horizontal segments each include a central section and opposed end sections. The table portion includes a table top secured between the central sections of the horizontal segments whereby empty space exists between corresponding opposed end sections of the horizontal segments. The table portion includes a pair of inverted generally U-shaped legs foldably secured to the table top for elevating the table portion when in an extended orientation. The legs fold against the table top in a closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
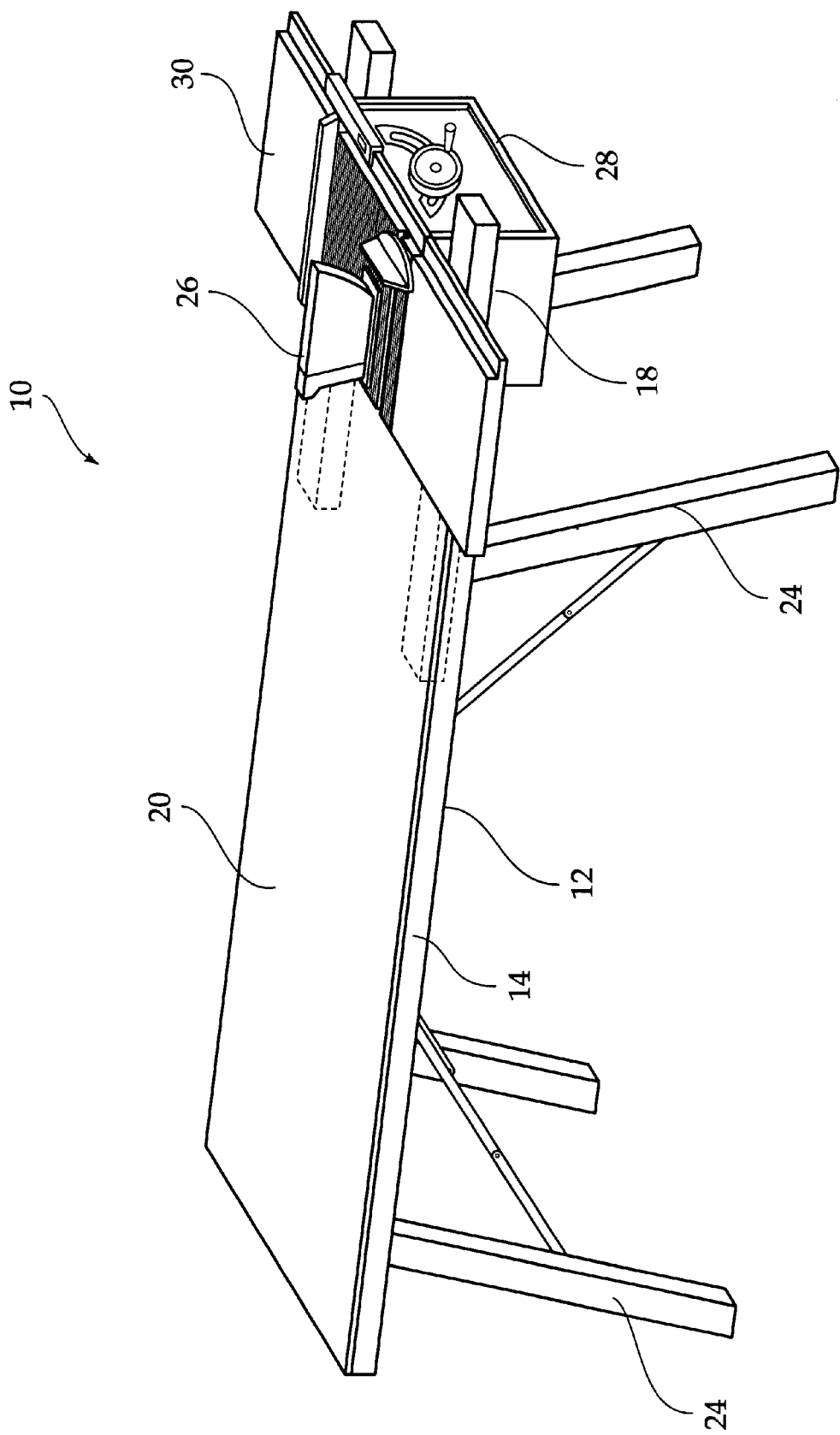
FIG. 1 is a perspective view of the preferred embodiment of the work table with a portable table saw support constructed in accordance with the principles of the present invention.
Figure 2:
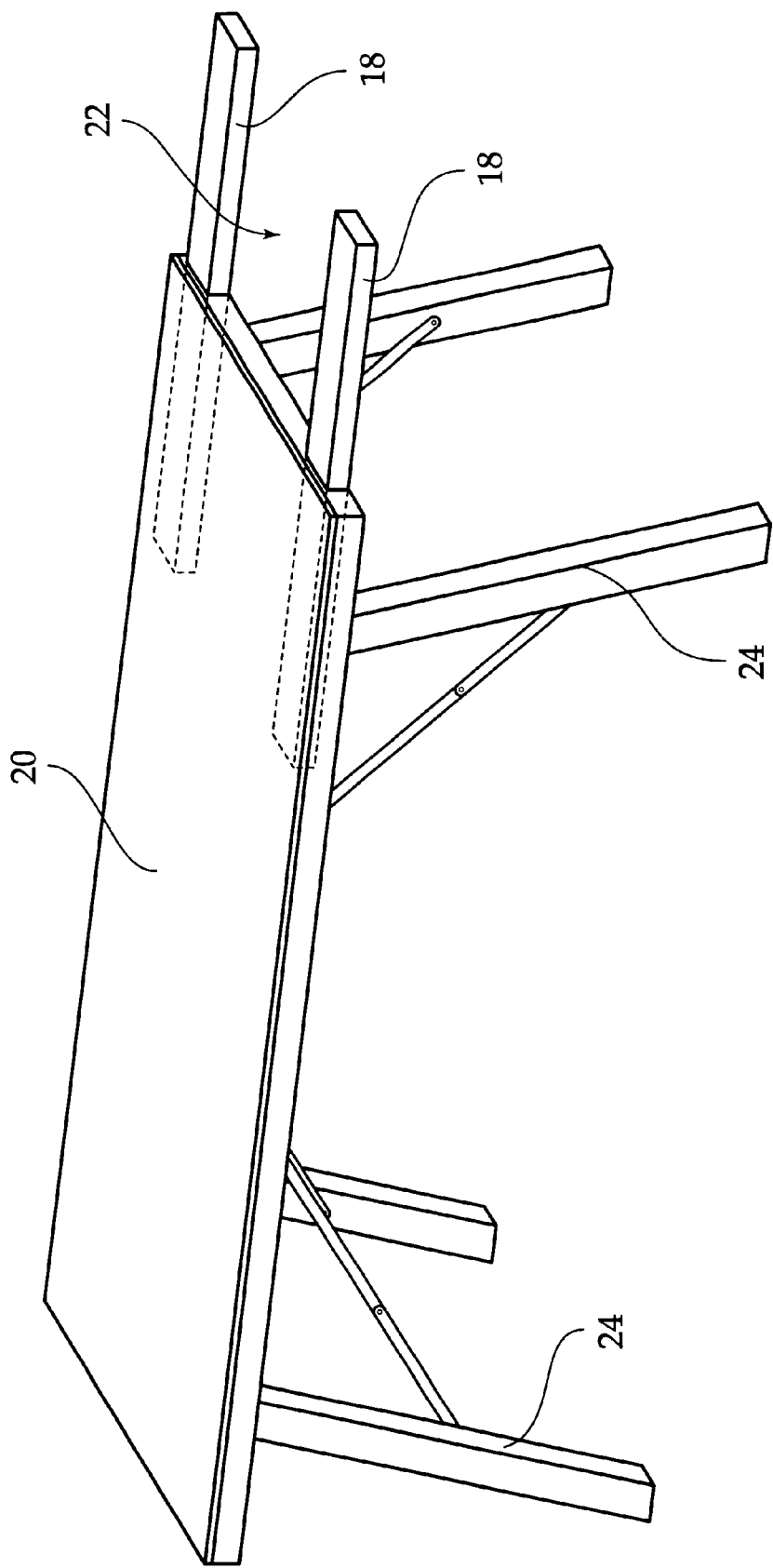
FIG. 2 is a perspective view of the present invention illustrated without a table saw.

With reference now to the drawings, and in particular, to FIGS. 1 and 2 thereof, the preferred embodiment of the new and improved work table with a portable table saw support embodying the principles and concepts of the present invention and generally designated by the reference number 10 will be described.

Specifically, it will be noted in the various Figures that the device relates to a work table with a portable table saw support for elevating a portable table saw for ease of use while also providing added work space. In its broadest context, the device consists of a table portion and a portable table saw. Such components are individually configured and correlated with respect to each other so as to attain the desired objective.

The table portion 12 is comprised of a pair of elongated horizontal segments 14 positioned in a spaced and parallel orientation. The horizontal segments 14 include opposed end sections 18. The table portion 12 includes a table top 20 secured between the central sections of the horizontal segments whereby empty space 22 exists between opposed end sections 18 of the horizontal segments 14. The table portion 12 includes a pair of inverted generally U-shaped legs 24 foldably secured to the table top 20 for elevating the table portion 12 when in an extended orientation. Note FIGS. 1 and 2. The legs 24 fold against the table top 20 in a closed orientation. The table portion 12 operates in all respects to that of a standard folding table except that the table top 20 is shorter than normal so as to leave the opposed ends 18 of the horizontal segments 14 exposed for holding the portable table saw, as discussed in greater detail hereinafter.

The portable table saw 26 is positionable between either of the opposed end sections 18 of the horizontal segments 14 of the table portion 12. Note FIG. 1. The portable table saw 26 has a base portion 28 that is positionable within the empty space 22 between the opposed end sections 18. The portable table saw 26 has a support plate 30 that is extendable over the opposed end sections 18 of the horizontal segments 14. The support plate 30 will rest on the opposed end sections 18 so as to elevate the portable table saw 26. The user can operate the portable table saw 26 in the normal manner while utilizing the table top 20 to hold their work product. Alternately, the table portion 12 can be used for holding two portable table saws for use by two operators.

As illustrated, the tabletop 22 extends between and along the horizontal segments 14. When lowered, the legs 24 define a substantially rectangular footprint therebetween. The tabletop 22 extends substantially in the area of the footprint, such that a substantially the entire tabletop 22 is directly above the footprint defined by the legs 24. The opposed end sections 18 are attached to the horizontal segments 14, extend coextensively outward therefrom, and extend beyond the tabletop 22 a significant distance. In general, each opposed end section 18 has two ends—one of which is attached to one of the horizontal segments 18, and the other of which is free. Accordingly, the free end of each opposed end section 18 is unsupported, and is cantilevered beyond the tabletop 22. Empty space is provided between the two parallel opposed end sections 18 which allows the support plate 30 of the portable table saw 26 to extend therebetween, with the base portion 28 of the table saw 26 extending at a level lower than the tabletop 22. Accordingly, the table saw 26 is supported by the table without occupying any of the tabletop 22.

The present invention will minimize the amount of bending that a user is accustomed to when operating the portable table saw 26 on the ground. By elevating the table saw 26, the user can operate it without having the need to bend over or sit on the floor to use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A work table with a portable table saw support, for ease of use while also providing extra work space, comprising:
    a portable table saw having a base portion and a support plate, wherein the base portion extends below the support plate;
    a table portion having a pair of parallel elongated horizontal segments, a table top extending between and along the horizontal segments, a pair of legs secured to the table top, the table top extending substantially above a footprint defined by the legs; and a pair of parallel, opposed end sections, each of the end sections coextensive with the horizontal segments, extending outwardly from the table top, each of the opposed end sections have an attached end which is attached to one of the end segments and a free end, such that the opposed end sections are cantilevered beyond the tabletop such that the opposed end sections are unsupported beyond the tabletop, an empty space is defined between the horizontal segments for selectively supporting the support plate of the table saw and allowing the base portion of the table saw to extend at a level below the tabletop.

* * * * *